(12) United States Patent
Fu et al.

(10) Patent No.: US 11,366,854 B2
(45) Date of Patent: Jun. 21, 2022

(54) MULTIMEDIA POSTER GENERATION METHOD AND TERMINAL

(71) Applicant: GUANGZHOU KUGOU COMPUTER TECHNOLOGY CO., LTD., Guangzhou (CN)

(72) Inventors: Hongcheng Fu, Shenzhen (CN); Dongbai Nie, Shenzhen (CN); Guojin Zhou, Shenzhen (CN); Bo Li, Shenzhen (CN); Fuwen Mo, Shenzhen (CN); Xinxin Huang, Shenzhen (CN)

(73) Assignee: GUANGZHOU KUGOU COMPUTER TECHNOLOGY CO., LTD., Guangzhou (CN)

( * ) Notice: Subject to any disclaimer, the term of this patent is extended or adjusted under 35 U.S.C. 154(b) by 575 days.

(21) Appl. No.: 16/086,167

(22) PCT Filed: May 10, 2016

(86) PCT No.: PCT/CN2016/081487
§ 371 (c)(1),
(2) Date: Sep. 18, 2018

(87) PCT Pub. No.: WO2017/067148
PCT Pub. Date: Apr. 27, 2017

(65) Prior Publication Data
US 2019/0108188 A1  Apr. 11, 2019

(30) Foreign Application Priority Data
Oct. 19, 2015  (CN) .......................... 201510679698.9

(51) Int. Cl.
*G06F 17/00* (2019.01)
*G06F 16/683* (2019.01)
(Continued)

(52) U.S. Cl.
CPC ............ *G06F 16/685* (2019.01); *G06F 16/00* (2019.01); *G06F 16/433* (2019.01);
(Continued)

(58) Field of Classification Search
CPC ...... G06F 16/685; G06F 40/106; G06F 40/51; G06F 40/109; G06F 16/00; G06F 16/433; G06Q 50/01; G06Q 30/02
See application file for complete search history.

(56) References Cited

U.S. PATENT DOCUMENTS

2002/0165797 A1  11/2002  Deitrickson
2007/0219937 A1*  9/2007  Lee .................. H04N 21/44204
(Continued)

FOREIGN PATENT DOCUMENTS

| CN | 102209259 A | 10/2011 |
|----|-------------|---------|
| CN | 103236007 A | 8/2013  |

(Continued)

OTHER PUBLICATIONS

USrobin2531610, "How to Make a Photo Slide Show With Music—Sony Vegas" 2014, https://www.youtube.com/watch?v=OcpTo_doFxE&.*

(Continued)

*Primary Examiner* — Mohammed H Zuberi
(74) *Attorney, Agent, or Firm* — Maier & Maier, PLLC

(57) ABSTRACT

Disclosed are a multimedia poster generation method and a terminal. The method includes: receiving a poster generation instruction; acquiring a poster resource, the poster resource including a plurality of background files and a lyric file of a multimedia file, and the multimedia file being a multimedia file selected by a user; acquiring a background file to be shared that is selected by the user from the plurality of background files, and acquiring lyric information to be shared that is selected by the user from the lyric file; and (Continued)

generating a multimedia poster of the multimedia file according to the lyric information to be shared and the background file to be shared.

16 Claims, 12 Drawing Sheets

(51) Int. Cl.
    *G06Q 30/02*         (2012.01)
    *G06F 16/00*         (2019.01)
    *G06F 16/93*         (2019.01)
    *G06F 40/51*         (2020.01)
    *G06F 40/106*       (2020.01)
    *G06F 40/109*       (2020.01)
    *G06F 16/432*       (2019.01)
    *G06Q 50/00*         (2012.01)

(52) U.S. Cl.
    CPC ............ *G06F 16/434* (2019.01); *G06F 16/93* (2019.01); *G06F 40/106* (2020.01); *G06F 40/109* (2020.01); *G06F 40/51* (2020.01); *G06Q 30/02* (2013.01); *G06Q 50/01* (2013.01)

(56) References Cited

U.S. PATENT DOCUMENTS

| | | | | |
|---|---|---|---|---|
| 2008/0021777 | A1* | 1/2008 | Mack | G09F 21/04 705/14.1 |
| 2008/0172288 | A1* | 7/2008 | Pilskalns | G06Q 30/0222 705/14.23 |
| 2009/0160735 | A1* | 6/2009 | Mack | G06Q 30/02 345/2.3 |
| 2009/0228799 | A1* | 9/2009 | Verbeeck | G10H 1/0008 704/235 |
| 2010/0180213 | A1 | 7/2010 | Karageorgos et al. | |
| 2013/0046857 | A1* | 2/2013 | Howe | H04L 65/80 709/219 |
| 2013/0295533 | A1* | 11/2013 | Spartz | G09B 19/04 434/156 |
| 2014/0002644 | A1 | 1/2014 | Fedorovskaya et al. | |
| 2014/0337374 | A1* | 11/2014 | Glass | G06F 16/435 707/769 |
| 2015/0003812 | A1* | 1/2015 | Soroka | H04N 9/8205 386/285 |
| 2015/0358261 | A1* | 12/2015 | Ko | H04L 51/046 709/206 |
| 2018/0004740 | A1* | 1/2018 | Liang | G06Q 50/01 |
| 2018/0366097 | A1* | 12/2018 | Sharp | G10L 15/22 |
| 2018/0374461 | A1* | 12/2018 | Serletic | H04N 9/8211 |

FOREIGN PATENT DOCUMENTS

| | | |
|---|---|---|
| CN | 103546805 A | 1/2014 |
| CN | 103559731 A | 2/2014 |
| CN | 103593142 A | 2/2014 |
| CN | 104123383 A | 10/2014 |
| CN | 104583924 A | 4/2015 |
| CN | 104683853 A | 6/2015 |
| JP | 4993512 B2 | 8/2012 |

OTHER PUBLICATIONS

Taylor Tutorials, "Sony Vegas Tutorial: How to Make Your Own Karaoke Version of Any Song!" https://www.youtube.com/watch?v=kccvl_vBBXM hereinafter "Taylor".*

Office Action dated Oct. 18, 2019, in corresponding Chinese Application No. 201510679698.9, 18 pages.

Office Action dated Mar. 30, 2020, in corresponding Chinese Application No. 201510679698.9, 19 pages.

Communication pursuant to Article 94(3) EPC dated Apr. 2, 2020, in corresponding European patent application No. 16856594.3, 8 pages.

Zhang Chunhong, "New Technologies, Library Space and Services", Jun. 30, 2014, pp. 134-135.

Anonymous, "Pro Presenter 5—User Manual", Feb. 8, 2013, pp. 1-164, Renewed Vision, Inc., XP055680512, [retrieved on Mar. 27, 2020].

International Search Report and Written Opinion dated Aug. 18, 2016 of corresponding International Application No. PCT/CN2016/081487; 13 pgs.

Chinese Office Action dated Mar. 4, 2019, in connection with corresponding CN Application No. 201510679698.9 (18 pgs., including English translation).

Extended European Search Report dated Apr. 1, 2019, including the Supplementary European Search Report and the European Search Opinion, in connection with corresponding EP Application No. 16856594.3 (8 pgs.).

Korean Office Action dated Jun. 26, 2019, in connection with corresponding KR Application No. 10-2018-7014376 (11 pgs., including English translation).

* cited by examiner

US 11,366,854 B2

MULTIMEDIA POSTER GENERATION METHOD AND TERMINAL

This application claims the priority of the Chinese patent application No. 201510679698.9, entitled "Multimedia Poster Generation Method and Device" and filed with the State Intellectual Property Office of China on Oct. 19, 2015, which is incorporated herein by reference in its entirety.

TECHNICAL FIELD

The present disclosure relates to a multimedia poster generation method and a terminal.

BACKGROUND

With the development of network technology, more and more multimedia platforms have emerged. A multimedia platform can provide audiovisual entertainment services, such as audio and video services for the public. For example, a song is a kind of audio, and the multimedia platform can provide entertainment services, such as auditioning or downloading of a song to a user.

Before the user auditions or downloads a song, the multimedia platform usually provides a singer name and a song name to the user, so as to make them understand the song and attract them to audition or download the song. However, such similar profile-like information only enables the user to have a superficial understanding of the song, but hardly arouses the user's interest due to the less information, which results in a poor communication.

SUMMARY

In an aspect, there is provided a multimedia poster generation method, including:
receiving a poster generation instruction;
acquiring a poster resource, where the poster resource includes a plurality of background files and a lyric file of a multimedia file and the multimedia file is a multimedia file selected by a user;
acquiring a background file to be shared that is selected by the user from the plurality of background files, and acquiring lyric information to be shared that is selected by the user from the lyric file; and
generating a multimedia poster of the multimedia file according to the lyric information to be shared and the background file to be shared.

In another aspect, there is provided a terminal, including:
one or more processors; and
a memory; where one or more programs are stored in the memory, the one or more programs are configured to be executed by the one or more processors and include instructions for performing the following operations:
receiving a poster generation instruction;
acquiring a poster resource, where the poster resource includes a plurality of background files and a lyric file of a multimedia file and the multimedia file is a multimedia file selected by a user;
acquiring a background file to be shared that is selected by the user from the plurality of background files, and acquiring lyric information to be shared that is selected by the user in the lyric file; and
generating a multimedia poster of the multimedia file according to the lyric information to be shared and the background file to be shared.

DETAILED DESCRIPTION

In order to clearly present the principles and advantages of the present disclosure, the present disclosure will be described in further detail with reference to the accompanying drawings.

At present, a multimedia sharing platform may provide downloading or auditioning services of multimedia files, such as an audio file and a video file, for a user. Before the user auditions or downloads a multimedia file in the multimedia sharing platform, in order to enable the user to have a deep understanding of the multimedia file and attract the user to audition or download the multimedia file, the multimedia sharing platform may provide a multimedia poster of the multimedia file for the user. The multimedia poster may provide the user with a large amount of information of the multimedia file, which is more than the profile information of the multimedia file, such that the user may have a deep understanding of the multimedia file when playing the multimedia poster, thereby attracting the user to audition or download.

A specific generation process of the multimedia poster provided by the multimedia sharing platform may be implemented by any of the following embodiments.

Figure 1:
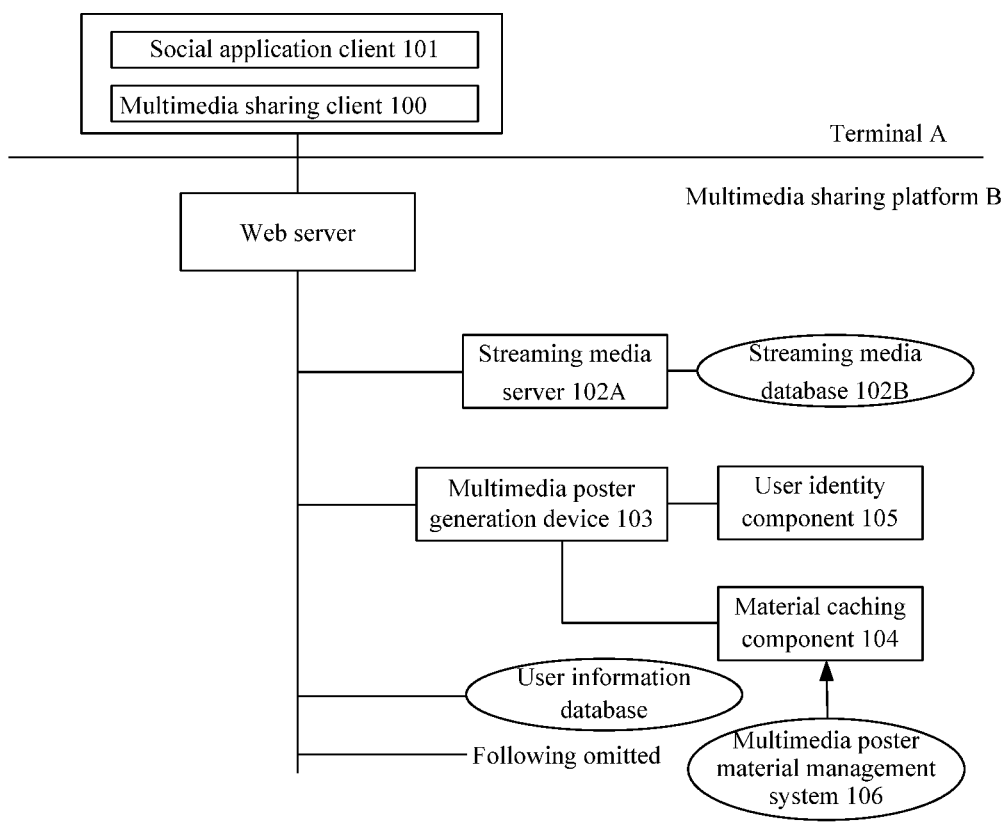
FIG. 1 is a schematic structural diagram of a multimedia sharing system involved in an embodiment of the present disclosure.

FIG. 1 is a schematic diagram of a structure of a multimedia sharing system involved in an embodiment of the present disclosure. The multimedia sharing system may include a terminal A and a multimedia sharing platform B.

A multimedia sharing client 100 corresponding to the multimedia sharing platform B may be running on the terminal A. A social application client 10 may also be running on the terminal A. The multimedia sharing platform may be a platform for providing online playing of multimedia files such as an audio file or a video file, for example, a song sharing application platform, which is not specifically limited in the embodiments of the present disclosure.

The multimedia sharing client 101 running on the terminal A may acquire a multimedia file provided by the multimedia sharing platform B through a network connection with the multimedia sharing platform B, and play the acquired multimedia file. The acquisition and playing may be performed based on a web server of the multimedia sharing platform B. The multimedia sharing client 100 is provided with an interface used for performing an information interaction with the social application client 101, such that the user may send information to be shared to the social application client 101 through the interface. The information to be shared may be, for example, an address link, a picture, or the like.

The multimedia sharing platform B may include: a streaming media server 102A, a streaming media database 102B, a multimedia poster generation device 103, a material caching component 104, a user identity component 105, and a multimedia poster material management system 106.

The streaming media server 102A and the streaming media database 102B are used to provide a streaming media service for the terminal A. For example, in response to a request for a streaming media from the terminal A, the streaming media corresponding to the requested streaming media identifier is sent to the terminal. The streaming media may be a live stream or a streaming media file, which is not limited in the embodiments of the present disclosure.

The multimedia poster generation device 103 is composed of the material caching component 104 and other systems, and used to provide multimedia poster acquisition, making, and sharing services.

The material caching component 104 is used to provide materials, such as a background file and a font style, for the making of the multimedia poster. Further, the material caching component 104 may also store user rights corresponding to the materials, so as to provide richer and more targeted materials for some users with higher levels. Optionally, the material caching component 104 may be a CMEM (Cloud Memory) component capable of providing a high-performance memory-level persistent storage service. Of course, the material caching component 104 may also be other storage carrier, such as mysql, oracle and etc.

The multimedia poster material management system 106 is used to update materials in a database of the multimedia poster material management system 106 based on an upload from an administrator or a user. For example, if a material uploaded by the administrator or the user is a material that does not exist in the database, the multimedia poster material management system 106 may store the material uploaded by the administrator or the user in the database. If a material uploaded by the administrator or the user is a modified material of a certain material in the database, the multimedia poster material management system 106 updates the certain material in the database to the material uploaded by the administrator or the user. The multimedia poster material management system 106 is also used to periodically update the material that has been updated in the database of the multimedia poster material management system 106 to the material caching component 104. In this case, in response to an acquisition request from the multimedia poster generation device 103, the material caching component 104 may provide the multimedia poster generation device 103 with the material stored in the material caching component 104, thereby avoiding a process of inquiring the database of the multimedia poster material management system 106, and accelerating a process of uploading the material.

The user identity component 105 is used to provide functions such as user right inquires and the like, and may provide information, such as an user right corresponding to any user identifier and the like, to the multimedia poster generation device 103 in response to an inquiry from the multimedia poster generation device 103.

It should be noted that the above system composition is only a brief introduction to some of the functions in the system. The multimedia sharing system may also include components having other functions, such as a user information database and a user relationship chain database, which are not specifically limited in the embodiments of the present disclosure.

Figure 2:
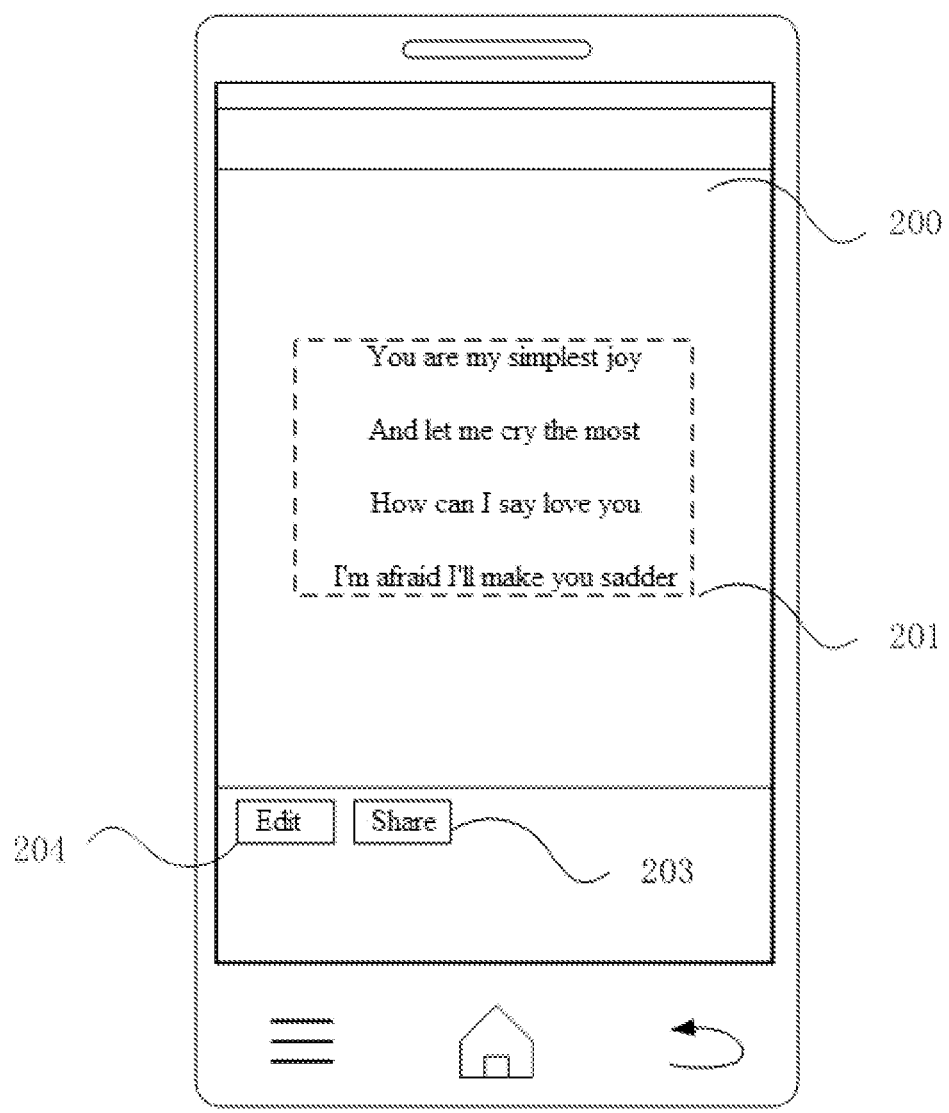
FIG. 2 is a schematic diagram of a multimedia poster provided by an embodiment of the present disclosure.

The multimedia poster provided by the embodiment of the present disclosure may be used as an intuitive display of multimedia information, so as to provide the user with more multimedia information. To facilitate the description of a specific form of the multimedia poster, as shown in FIG. 2. FIG. 2 is a schematic diagram of a multimedia poster provided by an embodiment of the present disclosure. In FIG. 2, a background file 200 may be displayed statically or dynamically. However, lyric information to be shared 201 may be a part of a lyric content of the multimedia file. This part of the lyric content of the multimedia file may be a part selected by the user, a climax fragment of the multimedia file, or the like, which is limited in the present embodiment of the present disclosure. In addition, if the displayed lyric information to be shared is partial information and the multimedia poster is a dynamic picture, the lyric information to be shared may also change continuously, e.g., a plurality of pieces of lyrics may be displayed in a rolling manner, respectively. Furthermore, the multimedia poster may also include a sharing option 203 and an editing option 204. The sharing option 203 may be used to display a plurality of social application interfaces, such that the plurality of social application interfaces may be displayed in a first designated area of a page (e.g., a lower half of the page) when the sharing option 203 is triggered. When any one of the social application interfaces is triggered, a current page link, a page link, a page thumbnail, or the like may be sent to the social application. A shared goal is determined according to further operations of the user, so as to achieve a purpose of generating the multimedia poster to the target platform. The editing option 204 may provide the user with an entry of a multimedia poster editing page, so as to achieve the purpose of automatically making the multimedia poster by using the multimedia poster editing page.

Figure 3:
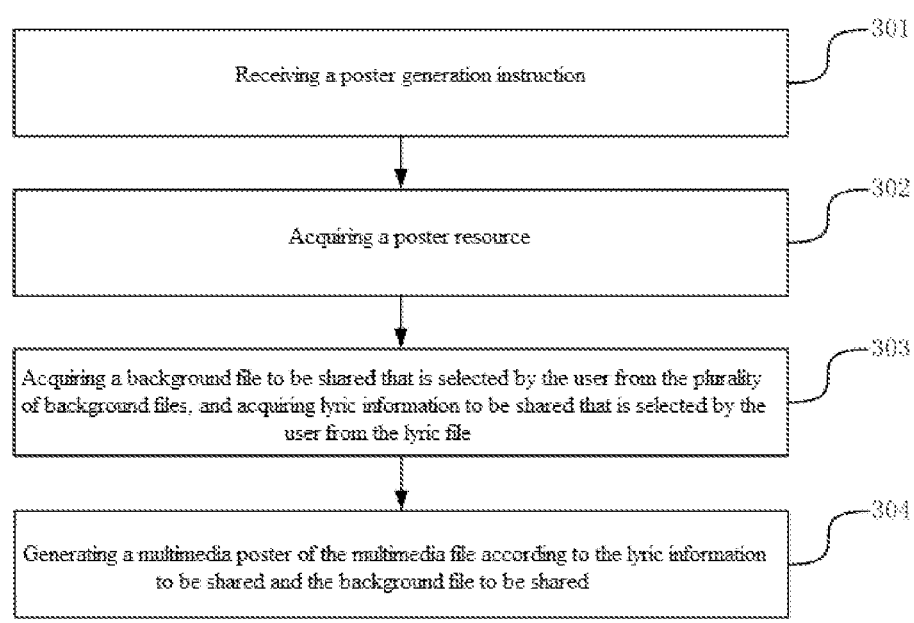
FIG. 3 is a flowchart of a multimedia poster generation method provided by an embodiment of the present disclosure.

FIG. 3 is a flowchart of a multimedia poster generation method provided by an embodiment of the present disclosure. Referring to FIG. 3, the method includes the following steps:

receiving a poster generating instruction in step 301.

The poster generation instruction may be triggered by an editing option of a poster on any page. The any page is a page that includes the editing option. In actual implementation, for any page on which the editing option is displayed, the user may click on the editing option on the page, such that the editing option triggers the poster generation instruction. The editing option may also be displayed as an option entitled "make your own lyric poster", an option entitled "change a song" displayed on the made poster, an option entitled "make a lyric poster for a song" provided on a browsing page or playing page of the song, an option entitled "make a lyric poster" provided on a sharing page, or the like, such that the user can enter the multimedia poster editing page according to the editing option. The specific entry of the multimedia poster editing page is not limited in the present embodiment of the present disclosure. During the use of a multimedia application, the editing entry may be provided on many different pages.

Referring to FIG. 3, the method further includes the following steps: acquiring a poster resource in step 302, where the poster resource includes a plurality of background files and a lyric file of a multimedia file, and the multimedia file is a multimedia file selected by a user.

The background file may be a static picture, a dynamic picture, some flash files or video files, and the like, which is not limited in the present embodiment of the present disclosure.

It should be noted that, when the user opens a multimedia poster service on a client, a related material compressed package of the multimedia poster may be acquired from the multimedia sharing platform. The client parses the package to present the multimedia poster. At the same time, the client may cache the material obtained by parsing; alternatively, the client may request the multimedia sharing platform to deliver a time stamp of each material in the multimedia sharing platform. The latest material in the multimedia sharing platform is determined by comparing a time stamp of the material cached by the client with a time stamp of the material delivered by the multimedia sharing platform. The determined latest material is pulled from the multimedia sharing platform to achieve a purpose of pulling the latest material only.

Referring to FIG. 3, the method further includes the following steps: acquiring a background file to be shared that is selected by the user from the plurality of background files and acquiring lyric information to be shared that is selected by the user from the lyric file in step 303;

generating a multimedia poster of the multimedia file according to the lyric information to be shared and the background file to be shared in step 304.

The multimedia poster may be a static picture, a dynamic picture (such as a picture of gif format), a dynamic picture file (a flash file, such as a file with swf format), a video file, or the like, which is not specifically limited in the present embodiment of the present disclosure.

After the user selects multiple materials of the multimedia poster, the editing operation of the multimedia poster can be ended by a publishing option (e.g., a publishing option 403 in FIG. 4A), such that the client can generate the multimedia poster of the multimedia file according to the currently selected materials. Optionally, the generation process may be a layer merging process. Further, after being generated, the multimedia poster may be saved to a local folder of the client, so that the user can share or view it later. If the multimedia poster is a dynamic multimedia poster (such as flash), when a platform to which the dynamic multimedia poster is shared does not support a dynamic display, the target platform may display the multimedia poster as a link, and the user clicks the link to display the dynamic multimedia poster in a browser.

Furthermore, after the multimedia poster is generated, the multimedia poster of the multimedia file may also be uploaded to a server. The server may reward the user who uploads the multimedia poster. Optionally, in a specific implementation, account information of the user in the server is acquired, and the account information includes a user level of the user and a number of virtual resources. The user may be rewarded by increasing the user level or the virtual resource data. For example, the server may issue points, virtual currency or other rewards to the user according to the multimedia poster uploaded by the user, so as to increase the participation sense of the user. That is, the server may acquire a user's account information, which may be saved in the server and may include a number of points or a number of virtual currencies of the user. Then, the number of points or the number of virtual currencies of the user can be increased, so as to realize the issuing of points and virtual currencies to the user. Alternatively, the server may also issue any form of rewards to the user according to a status of the multimedia poster being downloaded or being liked during a publishing process.

In another embodiment provided by the present disclosure, after generating the multimedia poster of the multimedia file, the method further includes: generating the multimedia poster to a target platform when a sharing operation for the multimedia poster is detected. In a specific implementation, when the sharing operation for the multimedia poster is detected, at least one social application interface is displayed. When it is detected that a social application interface is selected, the multimedia poster is shared through a social network corresponding to the selected interface. In some embodiments, the multimedia poster is shared with user's friends.

Herein, if the selected social network is a chat tool, the operation of sharing the multimedia poster to the user's friends through the social network corresponding to the selected interface may be as follows: acquiring at least one friend, a chat group, a friend circle, or the like selected by the user in the social network, and sending the multimedia poster to the selected at least one friend, the chat group, the friend circle, or the like. After the multimedia poster is sent to the chat group, all friends in the chat group may receive the multimedia poster. After the multimedia poster is sent to the friend circle, all user's friends may receive the multimedia poster from the friend circle, thereby achieving the sharing of the multimedia poster with the user's friends.

If the selected social network is a microblog or a cyberspace, the operation of sharing the multimedia poster to the user's friends through the social network corresponding to the selected interface may be as follows: publishing a microblog message on the microblog or publishing a space message on the cyberspace, and the microblog message or the space message includes the multimedia poster. All microblog friends of the user may receive the microblog message, or all friends of the user in the cyberspace may receive the cyberspace, thereby achieving the sharing of the multimedia poster with the friends.

The sharing operation may be triggered by a sharing option provided on a display page of the multimedia poster. The sharing option may be used to display one or more social application interfaces, such that the one or more social application interfaces may be displayed in a first designated area of a page (e.g., a lower half of the page) when the sharing option is triggered. When any one of the social application interfaces is triggered, a current page link, a page link, a page thumbnail or the like may be sent to the social application. A sharing goal is determined according to further operations of the user, so as to achieve the purpose of generating the multimedia poster to the target platform. Further, in another embodiment, after the sharing operation, the client may report the multimedia poster shared by the user to the multimedia sharing platform, so that the multimedia sharing platform can calculate the user's preference to the multimedia file based on the multimedia lyric content, the background file and the like in the multimedia poster shared by the user, so as to provide more accurate recommendation services for the user in the future.

Based on the embodiment shown in FIG. 3, "acquiring a poster resource" in the step 302 may include the following steps:

determining a multimedia file to be shared in step 1.

This step is mainly used to determine the multimedia file that the user wants to share currently. The client may provide a multimedia file selection page, so that the multimedia file can be edited based on a multimedia poster editing page after being selected by the user. For example, in an actual implementation, the client provides a multimedia file selection page, which may include at least one multimedia file. Herein, the at least one multimedia file may be a multimedia file locally stored in the client or a multimedia file acquired by the client from a streaming media server, e.g., at least one multimedia file with a highest download frequency acquired from the streaming media server. If the user wants to share a poster of a multimedia file, he/she may select the multimedia file on the multimedia file selection page. The client acquires the multimedia file, takes the multimedia file as a multimedia file to be shared, and displays the multimedia poster editing page to edit the multimedia poster to be shared.

Of course, the client may also directly provide the multimedia poster editing page, and provide an entry for selecting the multimedia file on the multimedia poster editing page for faster uploading. Herein, the entry of the multimedia file may be used for the user to find the multimedia file locally stored in the client and select the multimedia file to be shared locally, or the entry of the multimedia file may be a multimedia file search interface which is used for the user to search for a multimedia file that he/she wants to share from the streaming media server. Alternatively, this step may be used to start an editing function on the multimedia poster provided by the server, and select the multimedia file to be shared based on the multimedia file selection entry provided by the editing function.

The operation of "acquiring a poster resource" in the step 302 may further include the following steps: acquiring a lyric file of the multimedia file to be shared in step 2.

The step of acquiring the lyric file may refer to, according to an identifier of the multimedia file to be shared, acquiring a lyric file corresponding to the identifier of the multimedia file from a lyric file database (which may be set in a streaming media database). The lyric file may include a lyric of the multimedia file and a time tag of the lyric. Further, the time tag of the lyric may be a time tag of each word in the lyric, such that the color of the words during playing may change one by one according to an actual playing progress, so as to prompt the user which word is currently playing.

In order to make the page more personalized, more materials are further provided for the user to select. That is, the user may edit any one of the materials through the client to generate his/her own multimedia poster. Therefore, based on the embodiment shown in FIG. 3, the step 303 "acquiring a background file to be shared that is selected by the user from the plurality of background files, and acquiring lyric information to be shared that is selected by the user from the lyric file" refers to the following specific processes.

In Process 1, the lyric information to be shared that is selected by the user from the lyric file is acquired. An implementation process of this operation includes: displaying the lyric content of the multimedia file; and taking the selected lyric content as the lyric information to be shared, and displaying the lyric information to be shared when a selection operation for any one or more lines of the lyric content is detected.

In the Process 1, a complete lyric file may be pulled for each multimedia file. The lyric content in the lyric file is displayed in the first designated area of the multimedia poster editing page (for example, the lower half of the page). In addition, a selection box is displayed before each line of the multimedia lyric content. When it is detected that the selection box in any line is selected, the selected lyric content may be taken as the lyric information to be shared.

Figure 4A:
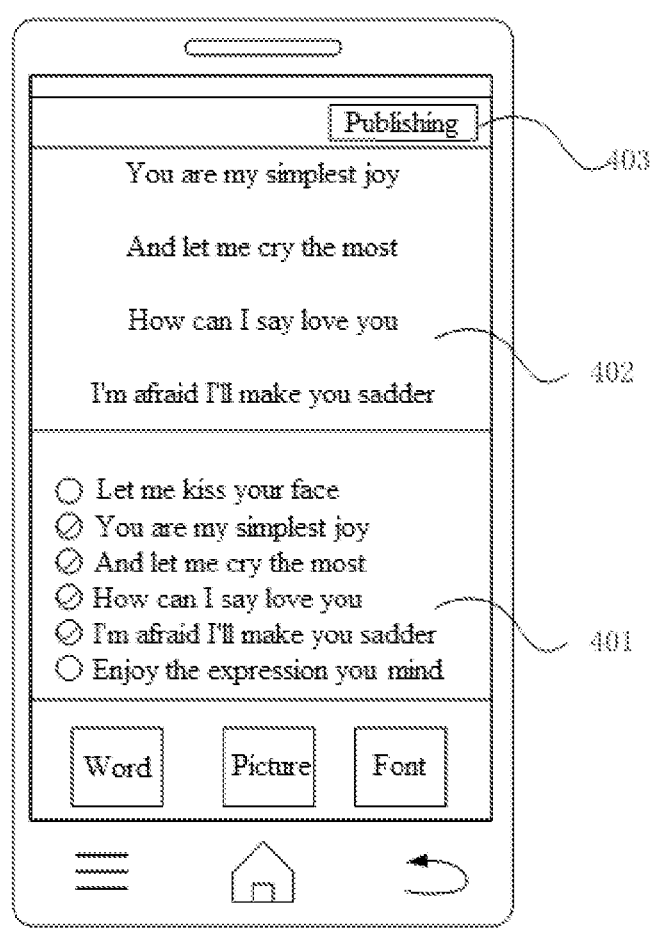
FIG. 4A and FIG. 4B are schematic diagrams of a multimedia poster editing page provided by an embodiment of the present disclosure.

For example, FIG. 4A is a schematic diagram of a multimedia poster editing page provided by an embodiment of the present disclosure. In FIG. 4A, a plurality of lines of lyric contents is displayed in the first designated area 401, in which the second line to the fifth line has been selected, thus the lyric contents of the second line to the fifth line are taken as the lyric information to be shared.

Further, whenever a line of the lyric content is selected, the lyric information to be shared may be displayed in a second designated area 402 of the multimedia poster editing page. The second designated area may refer to an area that does not overlap with the first designated area. Of course, the second designated area may be an area for displaying the lyric content.

Figure 4B:
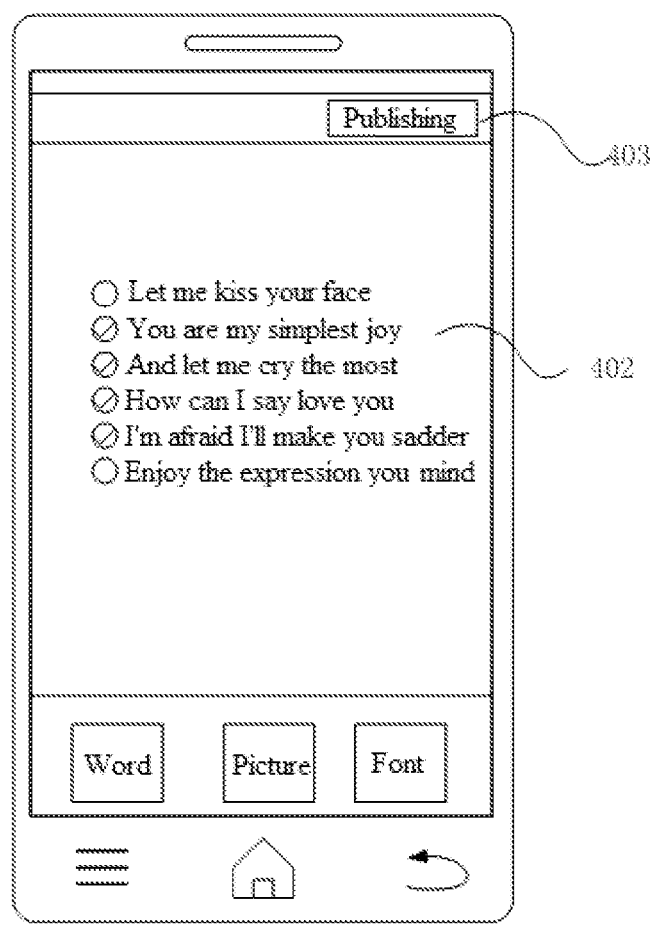

Optionally, in the present embodiment, in addition to displaying the lyric content of the lyric file in the first designated area as described above, there may also be other implementations. For example, referring to FIG. 4B, the lyric content of the lyric file may be displayed on the multimedia poster editing page. In addition, a selection box is displayed before each line of the multimedia lyric content. When it is detected that the selection box in any line is selected, a background color of the lyric content in the selected line may be set as a preset color.

Further, if a moving operation for the lyric information to be shared is detected on the multimedia poster editing page, the lyric information to be shared is promoted to be moved according to the moving operation for the lyric information to be shared in the multimedia poster. For example, the lyric information to be shared is originally displayed in the center, and if a move-down operation for the displayed lyric information to be shared is detected, then according to a moving distance of the move-down operation, a display position of the lyric information to be shared is moved downwards to a position corresponding to the move-down operation. By means of the movable display position, the editing effect is more in line with the user's needs.

Further, a translation service may also be provided for some foreign songs. For example, when a language of the lyric content is different from a preset language, a translation option is displayed. When a triggering operation on the translation option is detected, the lyric content with a language thereof being the preset language is acquired and displayed. The preset language may be a current system language or a language preset by the user.

The translation option may be displayed on the multimedia poster editing page. When the triggering operation on the translation option is detected, the lyric content is translated, so as to obtain a translated version which is displayed in the first designated area of the multimedia poster editing page. Optionally, a lyric library includes the lyric content in different language. Correspondingly, an implementation manner of translating the lyric content may be as follows: searching for the lyric content with the language being the preset language from the lyric library.

The translated version and the original version have the same lyric content sequence. When it is detected that the user selects any line of the translated content, the lyric content is taken as the lyric information to be shared, and the selected translated content is displayed in the second designated area.

In Process 2, a background file to be shared that is selected by the user from the plurality of background files is acquired. An implementation process of this operation includes: displaying the plurality of background files in the first designated area of the multimedia poster editing page; and when a selection operation on any of the background files is detected, taking the selected background file as the background file to be shared.

Further, in another embodiment, the specific process may further include Process 3: acquiring a font style of the lyric content of the multimedia file. This process includes: displaying a plurality of font styles in the first designated area of the multimedia poster editing page; and when a selection operation on any one of the font styles is detected, taking the selected font style as a font style of the multimedia file. The font styles may include a font size, a font, a font color, and the like. The embodiments of the present disclosure may provide various recommended font styles such as Wordart to enrich the user's selections. Of course, the font styles may also include a display mode of fonts, e.g., scrolling from bottom to top, scrolling from left to right, and other special display modes.

The acquisition methods provided in Process 2 and Process 3 are similar, both of which are of processes of editing a multimedia poster via the user' selection from optional pictures or fonts. Taking FIG. 5, which is a schematic diagram of a multimedia poster editing page according to an embodiment of the present disclosure, as an example, after any one of the background files or fonts is selected in the editing process, a preview effect diagram of the multimedia poster may be displayed based on the selected background file or font and the currently displayed lyric content, such that the user may know a final result, thereby facilitating editing.

Of course, for any one of the multimedia files, there may be system default lyric information to be shared, background file or font style. Therefore, this acquisition process may be as follows: acquiring, according to a file identifier of the multimedia file, the lyric information to be shared, a background file, or a font style of the lyric content that correspond to the file identifier from a material database, so as to provide an optional style for the user to view. In addition, the acquisition process may also be as follows: acquiring a paragraph of the lyric content, a background file, or a font style of the lyric content that is commonly used in each multimedia file, i.e., client's default material configurations, so as to provide a basic style for the user to view.

Optionally, based on the embodiment of FIG. 3, the generating of a multimedia poster of the multimedia file according to the lyric information to be shared and the background file to be shared in step 304 includes: acquiring a multimedia fragment to be shared, where a start time and an end time of the multimedia fragment corresponds to a start time and an end time of the lyric information to be shared; generating a dynamic multimedia poster based on the lyric information to be shared, the background file to be shared, and the multimedia fragment, where the dynamic multimedia poster is capable of playing the multimedia fragment during a display process.

In an embodiment of the present disclosure, if the user wants to make a dynamic multimedia poster, he/she may select a dynamic background file or a dynamic display mode when selecting the background file. After the dynamic display mode is selected, the client may send an identifier of the background file, an identifier of the multimedia file, and the start time and the end time corresponding to the lyric information to be displayed to the multimedia sharing platform, such that the multimedia sharing platform can intercept a multimedia fragment corresponding to the start time and the end time as a multimedia fragment to be shared from the multimedia file according to the start time and the end time corresponding to the lyric information to be displayed, call an SWF compiler to compile and synthesize the materials such as the multimedia fragment, the lyric information to be shared and the background file, and a compiled ActionScript bytecode file into a SWF file, and finally send the synthesized SWF file to the client. Based on the above-mentioned dynamic multimedia poster, the intercepted multimedia fragment may be played at the same time during the display process of the dynamic multimedia poster, such that the user can listen to an actual segment corresponding to the lyric content, thereby achieving a unity of the visual and auditory as well as a better audiovisual experience. The above process may be completed by the client and the server together, or may be completely performed by the client. That is, the used resources are provided by the server, but the actual synthesis and other processes are performed by the client, which is not specifically limited in present embodiment of the present disclosure.

Further, in another embodiment, a time tag for each word in the lyric information to be shared may also be acquired from the lyric file of the multimedia file in the process of generating the dynamic multimedia poster. A display time for displaying a word is determined for each word in the lyric information to be shared, such that the color of the lyric information to be shared can be changed word by word along with a playing progress of the multimedia fragment during the display process of the multimedia poster (when a word of the multimedia fragment is sung, the word being sung in the displayed lyric content changes a color). That is, the SWF compiler may be called in the synthesis process to compile and synthesize the materials, such as the multimedia fragment, the lyric information to be shared, the multimedia lyric file (e.g., a QRC file in which lyrics can be displayed in a word-by-word effect) and the background file, and the compiled ActionScript bytecode file into a SWF file. The synthesized SWF file is finally sent to the client.

All of the above-mentioned optional technical solutions may be combined arbitrarily to form alternative embodiments of the present disclosure, which is not described repeatedly herein.

Figure 6:
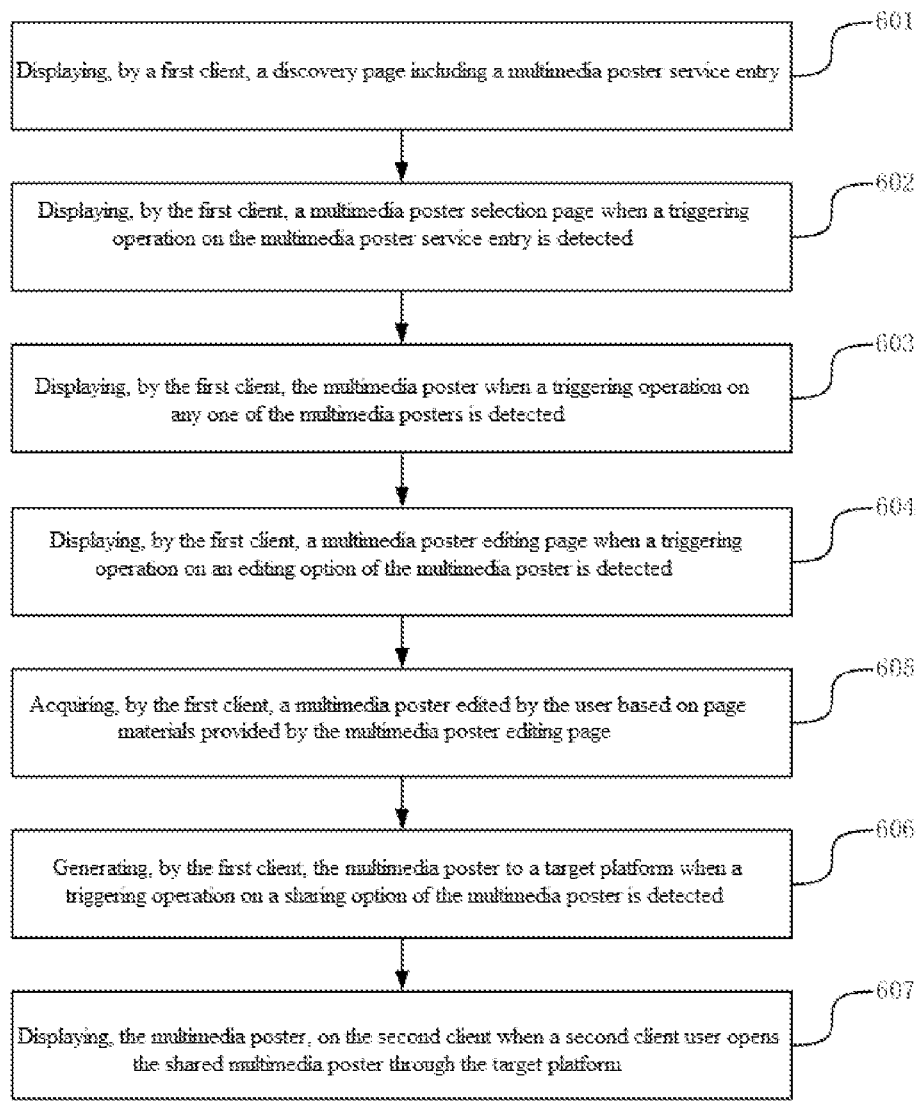
FIG. 6 is a specific implementation flowchart of a multimedia poster generation method provided by an embodiment of the present disclosure.

FIG. 6 is a flowchart of a specific implementation of a multimedia poster generation method provided by an embodiment of the present disclosure. Referring to FIG. 6, the implementation is described only by taking a case, in which the user selects a multimedia poster that has already been made on the client, as an example, and specifically includes the following steps:

displaying, by a first client, a discovery page including a multimedia poster service entry in step 601.

Figure 7:
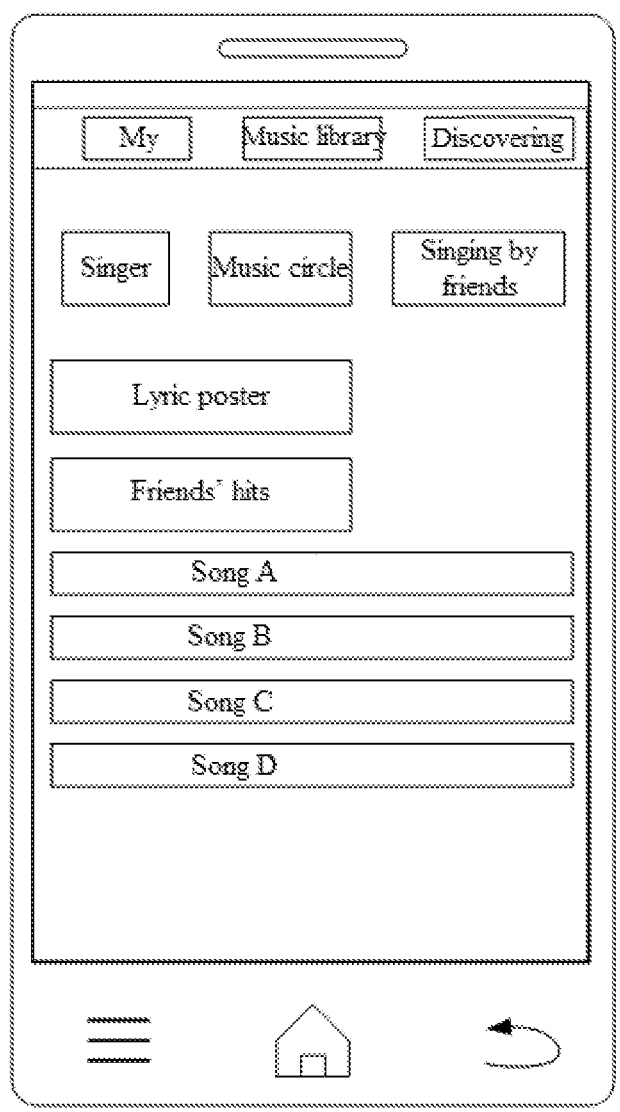
FIG. 7 is a schematic diagram of a discovery page provided by an embodiment of the present disclosure.

The discovery page may be a page which is provided by the multimedia sharing platform and used to acquire a multimedia file played by other users or recommend a multimedia file. The specific functions of the discovery page are not limited in the present embodiment of the present disclosure. The multimedia poster service entry may be used to enter a multimedia poster service for the user to select a multimedia poster to be shared or edit a multimedia poster. For example, referring to FIG. 7, FIG. 7 is a schematic diagram of a discovery page provided by an embodiment of the present disclosure. A lyric poster option in FIG. 7 is the multimedia poster service entry. FIG. 7 also includes other services, such as friend hits and music circles. Of course, the multimedia poster service entry may also be provided by other pages, which is not specifically limited in the present embodiment of the present disclosure.

The implementation illustrated in FIG. 6 further includes the following steps: displaying, by the first client, a multimedia poster selection page when a triggering operation on the multimedia poster service entry is detected in step 602, where the multimedia poster selection page is used to display a plurality of multimedia posters.

Figure 8:
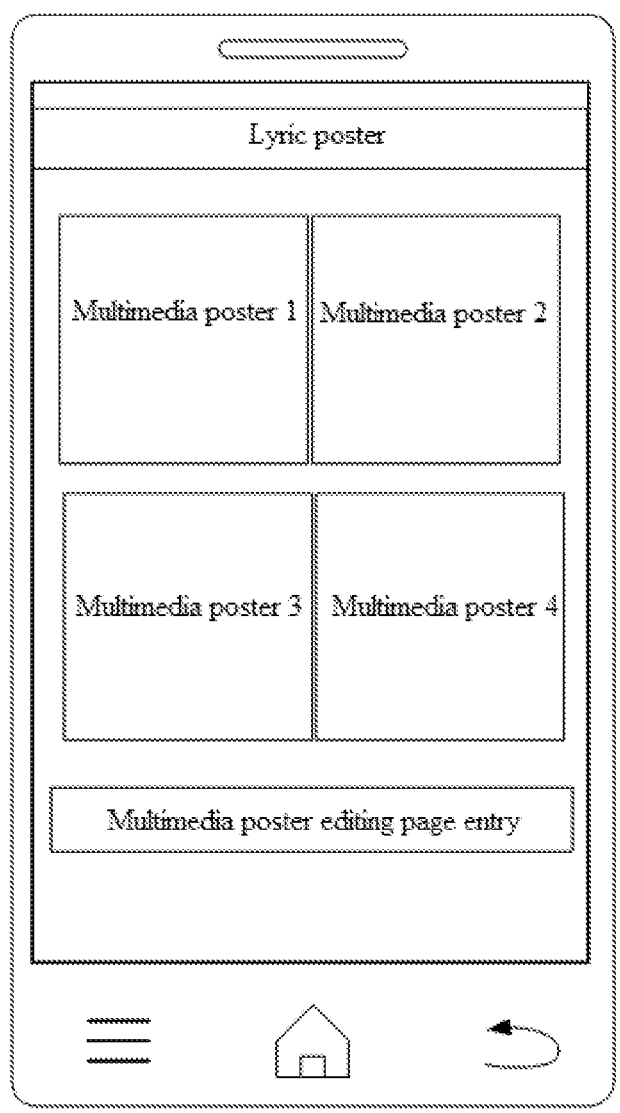
FIG. 8 is a schematic diagram of a multimedia poster selection page provided by an embodiment of the present disclosure.

Referring to FIG. 8, FIG. 8 is a schematic diagram of a multimedia poster selection page according to an embodiment of the present disclosure. The multimedia poster selection page may include not only a plurality of multimedia posters, but also a multimedia poster editing page entry.

Optionally, the multimedia posters included in the multimedia poster selection page may be the multimedia posters recommended by the streaming media server and received by the first client, or may be the multimedia posters searched by the first client from the streaming media server according to keywords input by the user. The streaming media server may recommend a preset number of the multimedia posters having the highest playing frequency or a preset number of latest online multimedia posters to the first client. The keyword input by the user may be a file name of a multimedia file that the user wants to search for, for example, when the multimedia file is a song, the keyword may be a name of the song.

The implementation illustrated in FIG. 6 further includes the following steps: displaying, by the first client, the multimedia poster when a triggering operation on any one of the multimedia posters is detected in step 603, where the multimedia poster is used to display lyric information on a background file.

The specific form of the multimedia poster is illustrated in FIG. 3.

The implementation illustrated in FIG. 6 further includes the following steps: displaying, by the first client, a multimedia poster editing page when a triggering operation on an editing option of the multimedia poster is detected in step 604.

Figure 5:
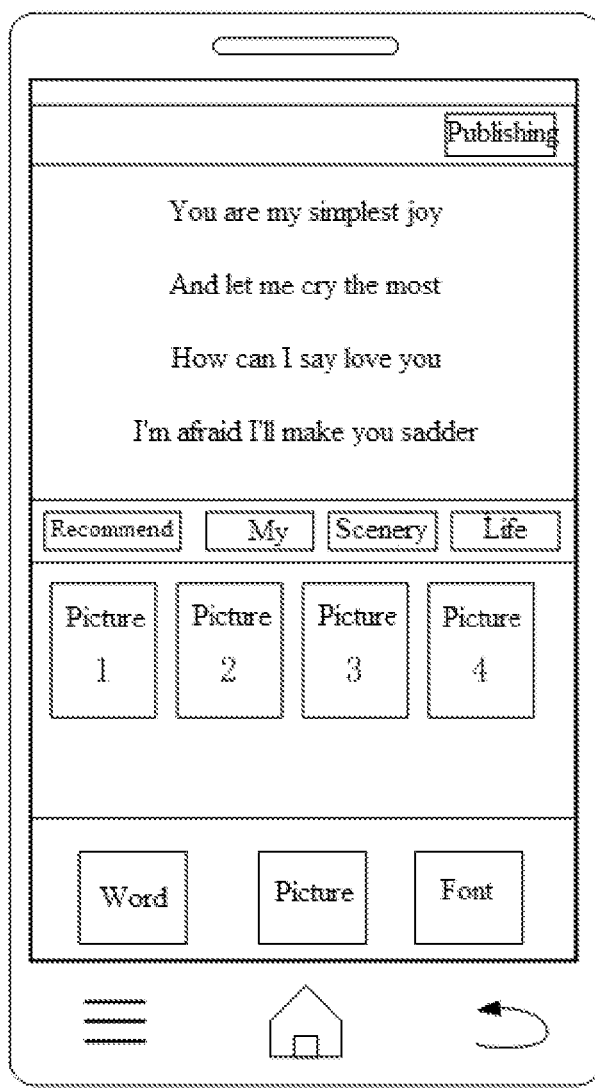
FIG. 5 is a schematic diagram of a multimedia poster editing page provided by an embodiment of the present disclosure.

The specific forms of the multimedia poster editing page are illustrated in FIG. 4A to FIG. 5.

The implementation illustrated in FIG. 6 further includes the following steps: acquiring, by the first client, a multimedia poster edited by the user based on page materials provided by the multimedia poster editing page in step 605, where the multimedia poster editing page is used to provide a plurality of page materials.

The page materials may be a background file, a poster display mode, a font style, and the like.

The editing process is not specifically described in the present embodiment, and may refer to the corresponding embodiment and optional embodiment described in FIG. 3.

The implementation illustrated in FIG. 6 further includes the following steps: generating, by the first client, the multimedia poster to a target platform when a triggering operation on a sharing option of the multimedia poster is detected in step 606.

Figure 9:
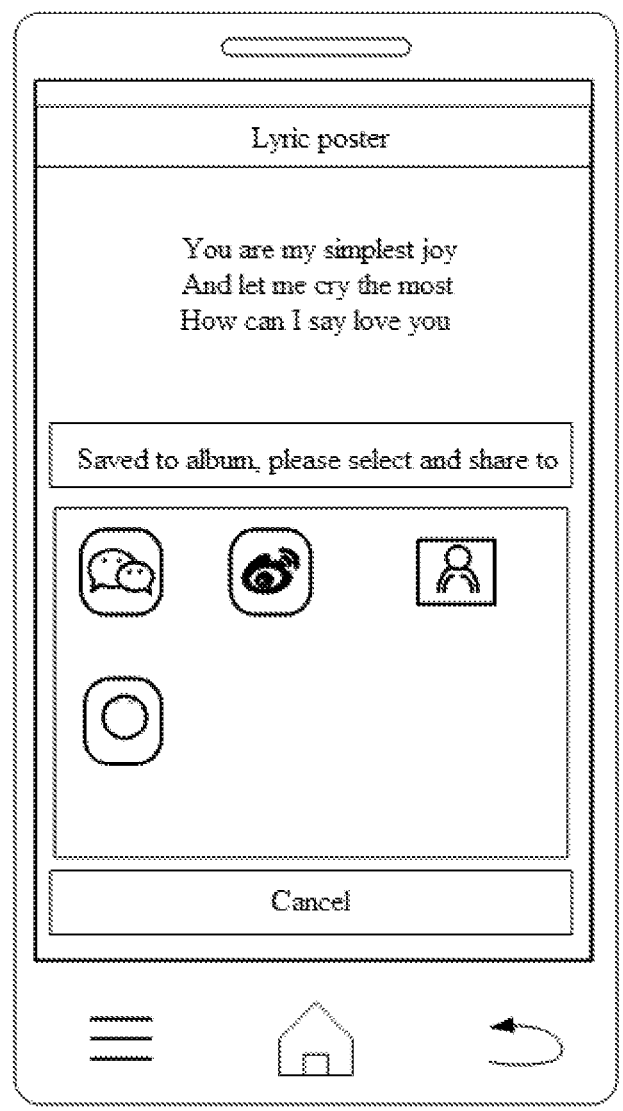
FIG. 9 is a schematic diagram of a multimedia poster provided by an embodiment of the present disclosure.

Referring to FIG. 9, FIG. 9 is a schematic diagram of a multimedia poster provided by an embodiment of the present disclosure. The plurality of social application interfaces are displayed in the first designated area of the multimedia poster.

The implementation illustrated in FIG. 6 further includes the following steps: displaying, the multimedia poster, on the second client when a second client user opens the shared multimedia poster through the target platform in step 607.

If the multimedia poster is in a flash form, the lyric information may be displayed in a manner of changing the color word by word during the display process, while a multimedia segment corresponding to the displayed lyric information may be heard. In a practical implementation, the multimedia fragment corresponding to the displayed lyric information is played, and meanwhile, the color of the displayed lyrics is changed word by word according to a display time of each word included in the displayed lyric information.

It should be noted that the multimedia poster may further include a playing entry, such that the second client can play the multimedia file through the playing entry. In addition, the multimedia poster may be displayed on the target platform statically, for example, in a manner of displaying a thumbnail of the multimedia poster, or may be displayed on the target platform dynamically, thereby bringing a more vivid display effect to the user.

A multimedia poster generation method is provided in the embodiments of the disclosure, so that a user can make a multimedia poster in which the lyric content is displayed on the background file thereof, which allows the multimedia poster to carry more multimedia-related information. Therefore, a new multimedia recommendation form is provided, so as to greatly improve the amount of the shared information and arouse user's interest in the multimedia file, thereby improving the propagation of the multimedia file.

Figure 10:
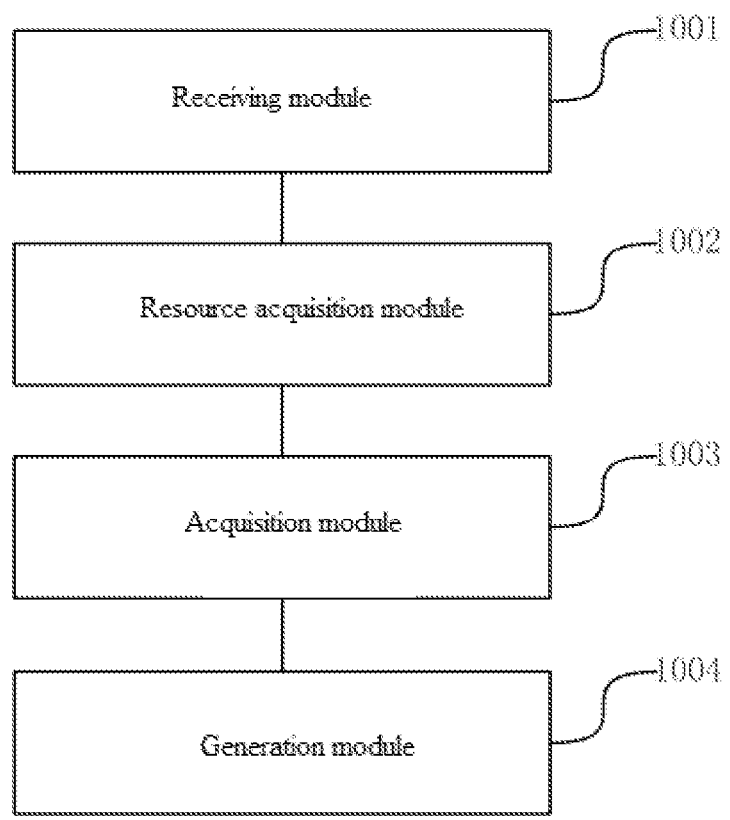
FIG. 10 is a schematic structural diagram of a multimedia poster generation device provided by an embodiment of the present disclosure.

FIG. 10 is a schematic diagram of a structure of a multimedia poster generation device provided by an embodiment of the present disclosure. Referring to FIG. 10, the device includes:

a receiving module 1001 configured to receive a poster generation instruction;

a resource acquisition module 1002 configured to acquire a poster resource, the poster resource including a plurality of background files and a lyric file of a multimedia file, and the multimedia file being a multimedia file selected by a user;

an acquisition module 1003 configured to acquire a background file to be shared that is selected by the user from the plurality of background files, and acquire lyric information to be shared that is selected by the user from the lyric file; and a generation module 1004 configured to generate a multimedia poster of the multimedia file according to the lyric information to be shared and the background file to be shared.

Optionally, the device further includes: a sharing module configured to, when a sharing operation for the multimedia poster is detected, display at least one social entry, determine the selected entry and share a multimedia poster through a social network corresponding to the selected entry.

Optionally, the device further includes: a display module configured to, when a selection operation for at least one line of the lyric content is detected, take the selected lyric content as lyric information to be shared, and display the lyric information to be shared.

Optionally, the display module is further configured to, when a language of the lyric content is different from a preset language, display a translation option; and acquire and display the lyric content with a language thereof being the preset language when a triggering operation on the translation option is detected.

Optionally, the generation module is configured to acquire a multimedia fragment to be shared, where a start time and an end time of the multimedia fragment correspond to a start time and an end time of the lyric information to be shared; and generate a dynamic multimedia poster based on the lyric information to be shared, the background file to be shared and the multimedia fragment, where the dynamic multimedia poster is capable of playing the multimedia fragment in the display process.

Optionally, the generation module is further configured to acquire a time tag for each word in the lyric information to be shared the a lyric file of the multimedia file in the process of generating the dynamic multimedia poster, and determine a display time of each word for displaying the each word in the lyric information to be shared, where the display time for each word is used to enable the color of the lyric information to be shared to be changed word by word along with a playing progress of the multimedia fragment during the display process of the multimedia poster.

Optionally, the device further includes: a font acquisition module configured to acquire a font style of the lyric content selected by the user; and the generation module configured to perform the steps of generating the multimedia poster of the multimedia file according to the lyric information to be shared and the background file to be shared based on the font style of the selected lyric content.

Optionally, the device further includes: an uploading module configured to upload the multimedia poster of the multimedia file to a server. The server acquires account information of the user in the server, and the account information includes a user level or a number of virtual resources of the user. The user may be rewarded by increasing the user level or the virtual resource data.

It should be noted that, during the process of generating the multimedia poster, the multimedia poster generation device provided by the above embodiment is illustrated only by taking a division of the above-mentioned functional modules as an example. In practical applications, the allocation of the above functions may be completed by different functional modules according to requirements, that is, an internal structure of a device is divided into different functional modules, so as to complete all or some of the functions described above. In addition, the multimedia poster generation device provided in the above embodiments and the embodiment of the multimedia poster generation method belong to the same concept, and the specific implementation process thereof can be with reference to the method embodiment, which is not repeated herein.

Figure 11:
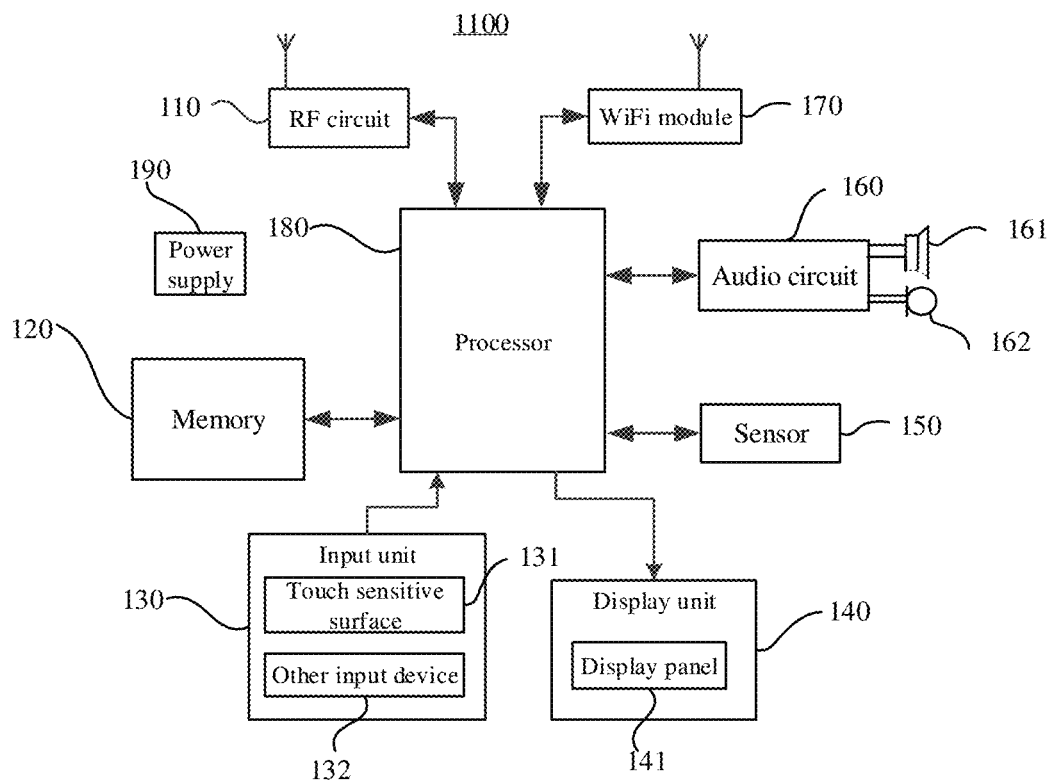
FIG. 11 is a schematic structural diagram of a terminal 1100 provided by an embodiment of the present disclosure.

The present embodiment provides a terminal, which may be configured to perform the multimedia poster generation method provided by the above-mentioned embodiments. Referring to FIG. 11, the terminal 1100 may include: an RF (Radio Frequency) circuit 110, a memory 120 including one or more computer-readable storage medium, an input unit 130, a display unit 140, a sensor 150, an audio circuit 160, and a WiFi (Wireless Fidelity) module 170, a processor 180 including one or more processing cores, a power supply 190 and other components. It should be appreciated by those skilled in the art that, the structure of the terminal shown in FIG. 11 does not constitute a limitation to the terminal, and it may include more or less components than those illustrated in the drawings, or combine some of the components, or be composed of different components.

Herein, the RF circuit 110 may be configured to receive and transmit signals during the transmitting and receiving of information or communication. In particular, after receiving downlink information from a base station, the RF circuit 110 transfers the information to one or more processors 180 to process. Also, the RF circuit 110 transmits uplink data to the base station. Generally, the RF circuit includes, but is not limited to an antenna, at least one amplifier, a tuner, one or more oscillators, a subscriber identity module (SIM) card, a transceiver, a coupler, a LNA (Low Noise Amplifier), a duplexer, etc. Furthermore, the RF circuit 110 may also communicate with other devices through wireless communications and networks. The wireless communication may use any communication standards or protocols, including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service), and the like.

The memory 120 may be configured to store software programs and modules. The processor 180 implements various functional applications and data processing by running the software programs and modules stored in the memory 120. The memory 120 may mainly include a program storage area and a data storage area, where the program storage area may store an operation system, an application required by at least one function (such as a sound playback function or an image playback function), and so on, and the data storage area may store data (such as audio data or phone book) created according to the use of the terminal 1100, and so on. In addition, the memory 120 may include a high-speed random access memory and may also include a non-volatile memory, such as at least one disk storage device, a flash memory device, or other volatile solid-state memory devices. Accordingly, the memory 120 may also include a memory controller, so as to provide an access from the processor 180 and the input unit 130 to the memory 120.

The input unit 130 may be configured to receive the input digits or characters information, and generate the signal inputs of keyboard, mouse, joystick, optical or trackball related to a user setting and a functional control. Specifically, the input unit 130 may include a touch sensitive surface 131 and other input device 132. The touch sensitive surface 131, also known as a touch screen or a track pad, may collect touch operations of a user (such as an operation on or near the touch sensitive surface 131 by a user using any suitable object or accessory component such as a finger or a stylus) on or near the touch sensitive surface 131, and drive a corresponding connection device according to a preset program. Alternatively, the touch sensitive surface 131 may include both of a touch detection device and a touch controller. Herein, the touch detection device detects a touching position of a user, detects a signal caused by the touch operation, and transmits the signal to the touch controller. The touch controller receives touch information from the touch detection device, converts it into coordinates of the touch point, and send the coordinates to the processor 180. The touch controller may also receive a command from the processor 180 and execute the command. In addition, the touch sensitive surface 131 may be realized in various types, such as resistive, capacitive, infrared and acoustic wave types. In addition to the touch sensitive surface 131, the input unit 130 may also include other input devices 132. Specifically, the other input devices 132 may include, but are not limited to, one or more of a physical keyboard, a function button (such as a volume control button, a switch button, etc.), a trackball, a mouse, an operation lever, and so on.

The display unit 140 may be configured to display information input by a user or information provided to the user, and various graphical user interfaces of the terminal 1100. These graphical user interfaces may be composed of graphics, text, icon, video, and any combination thereof. The display unit 140 may include a display panel 141, and alternatively, the display panel 141 may be configured by LCD (Liquid Crystal Display), OLED (Organic Light-Emitting Diode), and so on. Further, the touch sensitive surface 131 may cover the display panel 141. When the touch sensitive surface 131 detects a touch operation on or near the touch sensitive surface 131, the touch operation is sent to the processor 180 to determine a type of touch event, and subsequently the processor 180 provides a corresponding visual output on the display panel 141 according to the type of touch event. Although the touch sensitive surface 131 and the display panel 141 in FIG. 11 are implemented as two separate components to achieve an input function and an output function respectively, in some embodiments, the touch sensitive surface 131 and the display panel 141 may also be integrated to achieve the input and output functions.

The terminal 1100 may further include at least one kind of sensor 150, such as a light sensor, a motion sensor, and other sensors. Specifically, the light sensor may include an ambient light sensor and a proximity sensor. Herein, the ambient light sensor may adjust a brightness of the display panel 141 according to a brightness of the ambient light. The proximity sensor may turn off the display panel 141 and/or backlight when the terminal 1100 moves close to an ear. As a kind of the motion sensor, a gravity acceleration sensor may detect an amplitude of the acceleration in all directions (typically in three axes), and may detect an amplitude and a direction of the gravity in a stationary state, which may be applied to the applications for recognizing the attitudes of the mobile phone (such as horizontal and vertical screen switching, related games, attitudes calibration of a magnetometer), the applications with functions related to vibration recognition (such as a pedometer, clicking), etc. The terminal 1100 may also be equipped with other sensors such as a gyroscope, a barometer, a hygrometer, a thermometer, an infrared sensor, etc., the description of which is not repeated herein.

The audio circuit 160, a speaker 161 and a microphone 162 may provide an audio interface between the user and the terminal 1100. The audio circuit 160 may convert the received audio data into an electrical signal which is transmitted to the speaker 161 and converted into a sound signal to be output by the speaker 161. On the other hand, the microphone 162 converts the collected sound signal into an electrical signal which is received and converted into audio data by the audio circuit 160, and then the audio data, after being output to and processed by the processor 180, is transmitted to, for example, another terminal via the RF circuit 110, or output to the memory 120 for further processing. The audio circuit 160 may also include a near plug jack, so as to allow a communication between an external headphone and the terminal 1100.

WiFi belongs to a short-range wireless transmission technology. The terminal 1100 can help a user to send and receive e-mails, browse webpages and access streaming media, and the like through a WiFi module 170, and the WiFi module 170 provides a wireless broadband Internet access. Although FIG. 11 shows the WiFi module 170, it should be understood that the WiFi module 170 is not a necessary component of the terminal 1100, and may be omitted as desired without changing the essence of the disclosure.

The processor 180 is a control center of the terminal 1100 that connects various parts of the entire mobile phone through various interfaces and circuits, performs various functions of the terminal 1100 and processes data thereof by running and executing software programs and/or modules stored in the memory 120 and by invoking the data stored in the memory 120, so as to monitor the mobile phone on the whole. Optionally, the processor 180 may include one or more processing cores. Optionally, the processor 180 may integrate an application processor and a modem processor, where the application processor mainly processes an operation system, a user interface, an application and the like, and the modem processor mainly processes the wireless communication. It should be understood that, the above modem processor may be not integrated in the processor 180.

The terminal 1100 may also include a power supply 190 (such as a battery) which is used to supply power to each component. Optionally, the power supply may be logically connected to the processor 180 through a power supply management system, so as to manage the functions such as charging, discharging and power consumption, etc. through the power supply management system. The power supply 190 may also include one or more components of an AC or DC power, a recharging system, a power fault detection circuit, a converter or an inverter, a power status indicator, etc.

Although not shown, the terminal 1100 may also include a camera, a Bluetooth module, and the like, the details of which is not repeated herein. In this specific embodiment, a display unit of the terminal is a touch screen display. The terminal further includes a memory and one or more programs, where the one or more programs is stored in the memory and configured to be performed by the one or more processors 180. The one or more programs include instructions for executing operations at the terminal side in FIG. 3 and optional embodiments thereof.

Figure 12:
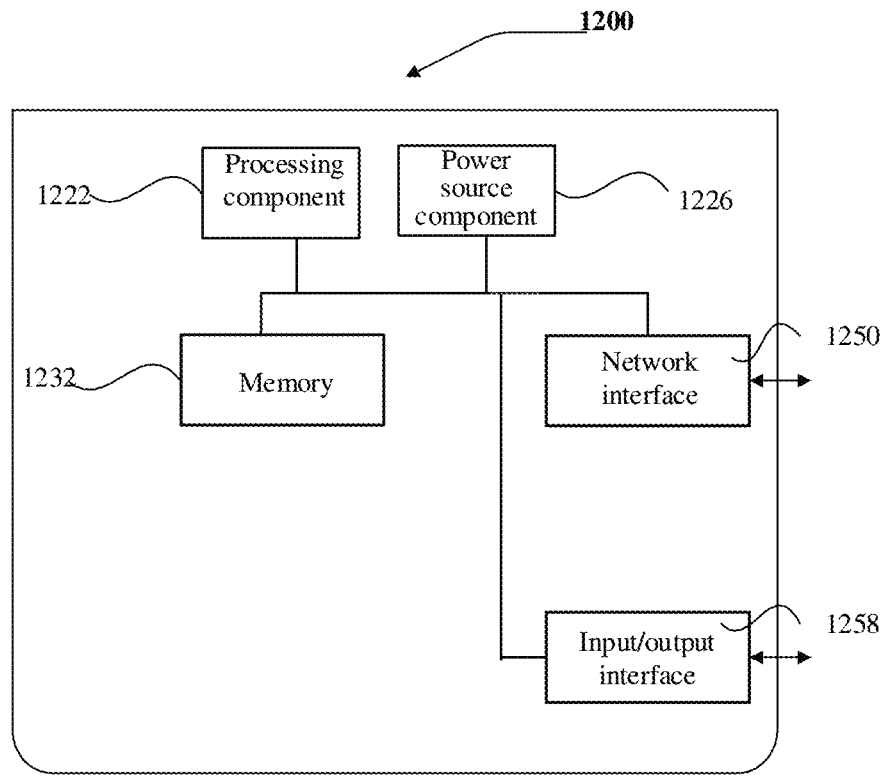
FIG. 12 is a block diagram of a server 1200 illustrated according to an exemplary embodiment.

FIG. 12 is a block diagram of a server 1200 illustrated in an exemplary embodiment. Referring to FIG. 12, the server 1200 includes a processing component 1222 further including one or more processors, and a storage resource represented by the memory 1232 for storing instructions executed by the processing component 1222, such as application program. The application program stored in the memory 1232 may include one or more modules each corresponding to a set of instructions. In addition, the processing component 1222 is configured to execute instructions, so as to perform the above-mentioned multimedia poster generation method.

The server 1200 may also include a power source component 1226 which is configured to execute power management for the apparatus 1200, a wired or wireless network interface 1250 which is configured to connect the apparatus 1200 to a network, and an input/output (I/O) interface 1258. The apparatus 1200 can operate the operation system stored in the memory 1232, for example, Windows Server™, Mac OS X™, Unix™, Linux™ or FreeBSD™.

In an exemplary embodiment, there is also provided a non-transitory computer-readable storage medium including instructions, such as a memory including instructions. The instructions may be executed by a processor of a terminal, so as to complete the multimedia poster generation method. For example, the non-transitory computer-readable storage medium may be a ROM, a random access memory (RAM), a CD-ROM, a magnetic tape, a floppy disk, an optical data storage device, or the like.

It should be understood by those ordinary skilled in the art that, all or part of the steps for implementing the above embodiments may be completed through hardware, or may be completed by the hardware instructed by programs. The programs may be stored in a computer-readable storage medium which may be a read-only memory, a magnetic disk or an optical disk.

The foregoing descriptions are merely some exemplary embodiments of the present disclosure, and do not intend to limit the present disclosure. Any modification, equivalent substitution and improvements that fall into the spirit and principle of the present disclosure shall be included in the protection scope of the present disclosure.

What is claimed is:

1. A multimedia poster generation method, comprising:
receiving a poster generation instruction;
acquiring a poster resource, wherein the poster resource comprises a plurality of background files and a lyric file of a multimedia file and the multimedia file is a multimedia file selected by a user;
acquiring a background file to be shared that is selected by the user from the plurality of background files, and acquiring lyric information to be shared that is selected by the user from the lyric file; and
generating a multimedia poster of the multimedia file according to the lyric information to be shared and the background file to be shared;
wherein the step of generating the multimedia poster of the multimedia file according to the lyric information to be shared and the background file to be shared comprises:
acquiring a time tag of each word in the lyric information to be shared from a lyric file of the multimedia file during a process of generating the dynamic multimedia poster, and determining a display time of each word for displaying the each word in the lyric information to be shared;
sending an identifier of the background file to be shared, an identifier of the multimedia file, and a start time and an end time corresponding to the lyric information to be displayed to the multimedia sharing platform after a dynamic display mode is selected, such that the multimedia sharing platform intercepts a multimedia fragment corresponding to the start time and the end time as a multimedia fragment to be shared from the multimedia file according to the start time and the end time, and a start time and an end time of the multimedia fragment corresponds to the start time and the end time of the lyric information to be shared;
generating a dynamic multimedia poster based on the lyric information to be shared, the background file to be shared and the multimedia fragment,
wherein a color of the lyric information to be shared is changed word by word along with a playing progress of the multimedia fragment in a display process of the multimedia based on the display time of each word for displaying the each word.

2. The method according to claim 1, wherein after generating the multimedia poster of the multimedia file, the method further comprises:
displaying at least one social entry, determining a selected entry, and sharing the multimedia poster through a social network corresponding to the selected entry when a sharing operation for the multimedia poster is detected.

3. The method according to claim 1, wherein after acquiring the poster resource, the method further comprises:
displaying a lyric content of the multimedia file; and
taking the selected lyric content as lyric information to be shared, and displaying the lyric information to be shared when a selection operation for at least one line of the lyric content is detected.

4. The method according to claim 3, wherein after acquiring the poster resource, the method further comprises:
displaying a translation option when a language of the lyric content is different from a preset language; and
acquiring and displaying the lyric content with a language being the preset language when a triggering operation for the translation option is detected.

5. The method according to claim 1, further comprising:
acquiring a font style of the lyric content selected by the user; and
performing the step of generating the multimedia poster of the multimedia file according to the lyric information to be shared and the background file to be shared base on the font style of the lyric content selected by the user.

6. The method according to claim 1, wherein after the step of generating the multimedia poster of the multimedia file according to the lyric information to be shared and the background file to be shared, the method further comprises:
uploading the multimedia poster of the multimedia file to a server, so that the server acquires account information of the user in the server, wherein the account information includes a user level or a number of virtual resources of the user; and the user is rewarded by increasing the user level or the number of the virtual resources.

7. A terminal, comprising:
one or more processors; and
a memory;
wherein one or more programs are stored in the memory, the one or more programs are configured to be executed by the one or more processors and comprise instructions for performing the following operations:
receiving a poster generation instruction;
acquiring a poster resource, wherein the poster resource comprises a plurality of background files and a lyric file of a multimedia file, and the multimedia file is a multimedia file selected by a user;
acquiring a background file to be shared that is selected by the user from the plurality of background files, and acquiring lyric information to be shared that is selected by the user from the lyric file; and
generating a multimedia poster of the multimedia file according to the lyric information to be shared and the background file to be shared;
wherein the step of generating the multimedia poster of the multimedia file according to the lyric information to be shared and the background file to be shared comprises:
acquiring a time tag of each word in the lyric information to be shared from a lyric file of the multimedia file during a process of generating the dynamic multimedia poster, and determining a display time of each word for displaying the each word in the lyric information to be shared; sending an identifier of the background file to be shared, an identifier of the multimedia file, and a start time and an end time corresponding to the lyric information to be displayed to the multimedia sharing platform after a dynamic display mode is selected, such that the multimedia sharing platform intercepts a multimedia fragment corresponding to the start time and the end time as a multimedia fragment to be shared from the multimedia file according to the start time and the end time, and a start time and an end time of the multimedia fragment corresponds to the start time and the end time of the lyric information to be shared; generating a dynamic multimedia poster based on the lyric information to be shared, the background file to be shared and the multimedia fragment, wherein a color of the lyric information to be shared is changed word by word along with a playing progress of the multimedia fragment in a display process of the multimedia based on the display time of each word for displaying the each word.

8. The terminal according to claim 7, wherein the one or more programs further include instructions for performing the following operation:
displaying at least one social entry, determining a selected social entry, and sharing the multimedia poster through a social network corresponding to the selected social entry when a sharing operation for the multimedia poster is detected.

9. The terminal according to claim 7, wherein the one or more programs further include instructions for performing the following operations:
displaying a lyric content of the multimedia file; and
taking the selected lyric content as lyric information to be shared and displaying the lyric information to be shared when a selection operation for at least one line of the lyric content is detected.

10. The terminal according to claim 9, wherein the one or more programs further include instructions for performing the following operations:
displaying a translation option when a language of the lyric content is different from a preset language; and
acquiring and displaying the lyric content with a language thereof being the preset language when a triggering operation for the translation option is detected.

11. The terminal according to claim 7, wherein the one or more programs further include instructions for performing the following operations:
acquiring a font style of the lyric content selected by the user; and
performing the step of generating the multimedia poster of the multimedia file according to the lyric information to be shared and the background file to be shared based on the font style of the lyric content selected by the user.

12. The terminal according to claim 7, wherein the one or more programs further include instructions for performing the following operations:
uploading the multimedia poster of the multimedia file to a server, so that the server acquires account information of the user in the server, wherein the account information includes a user level or a number of virtual resources of the user; and the user is rewarded by increasing the user level or the number of virtual resources of the user.

13. The method according to claim 2, further comprising:
acquiring a font style of the lyric content selected by the user; and
performing the step of generating the multimedia poster of the multimedia file according to the lyric information to be shared and the background file to be shared base on the font style of the lyric content selected by the user.

14. The method according to claim 2, wherein after the step of generating the multimedia poster of the multimedia file according to the lyric information to be shared and the background file to be shared, the method further comprises:
uploading the multimedia poster of the multimedia file to a server, so that the server acquires account information of the user in the server, wherein the account information includes a user level or a number of virtual resources of the user; and the user is rewarded by increasing the user level or the number of the virtual resources.

15. The terminal according to claim 8, wherein the one or more programs further include instructions for performing the following operations:
acquiring a font style of the lyric content selected by the user; and
performing the step of generating the multimedia poster of the multimedia file according to the lyric information to be shared and the background file to be shared based on the font style of the lyric content selected by the user.

16. The terminal according to claim 8, wherein the one or more programs further include instructions for performing the following operations:
uploading the multimedia poster of the multimedia file to a server, so that the server acquires account information of the user in the server, wherein the account information includes a user level or a number of virtual resources of the user; and the user is rewarded by increasing the user level or the number of virtual resources of the user.

* * * * *